B. WRIGHT.
Churn Dasher.
No. 42,984.
Patented May 31, 1864.
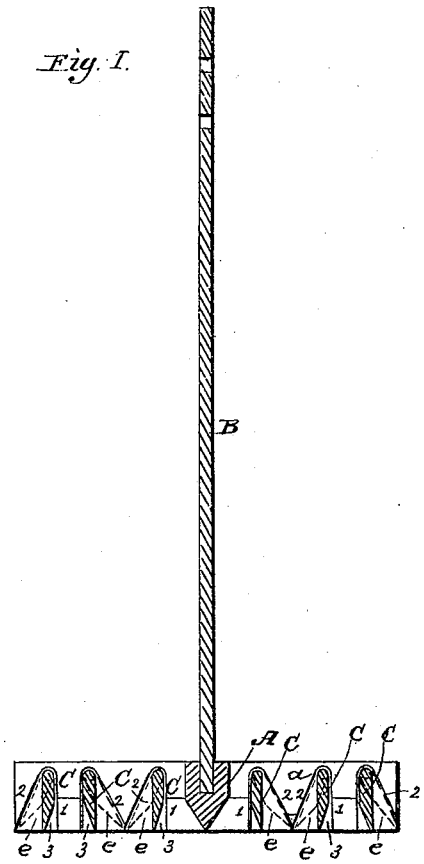
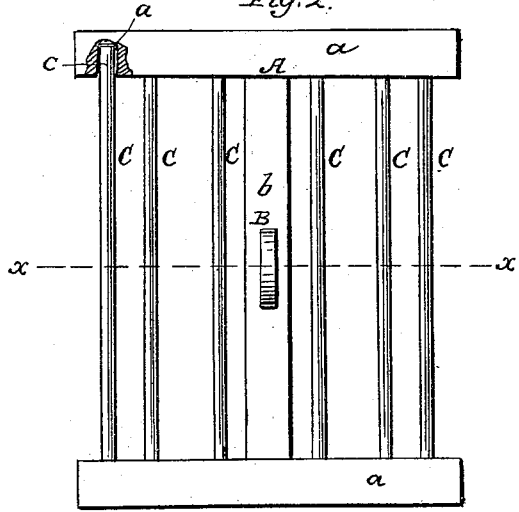

UNITED STATES PATENT OFFICE.

BAXTER WRIGHT, OF CARDIFF, NEW YORK.

CHURN-DASHER.

Specification forming part of Letters Patent No. 42,984, dated May 31, 1864.

*To al" whom it may concern:*

Be known that I, BAXTER WRIGHT, of Card. , in the county of Onondaga and State of New York, have invented a new and Improved Churn-Dash; and I do hereby declare that the following is a full, clear, and exact description of the same, reference being had to the accompanying drawings, making a part of this specification, in which—

Figure 1 is a side sectional view of my invention, taken in the line $x\ x$, Fig. 2; Fig. 2, a plan or top view of the same.

Similar letters of reference indicate corresponding parts in the two figures.

This invention consists in constructing the dash with a series of swinging blades fitted in a frame and arranged in such a manner that they will spread outward at their lower parts as the dash is forced down and the cream be compressed between the narrow spaces at the top of the blades, the latter assuming a vertical position as the dash is drawn upward, whereby the cream is agitated and operated upon in such a manner as to cause the butter to be produced in a short period of time, and with a moderate expenditure of power, and the butter, when produced, gathered very expeditiously.

To enable those skilled in the art to fully understand and construct my invention, I will proceed to describe it.

A represents the frame of the dash, which is composed of two parallel bars, $a\ a$, connected by a cross-bar, $b$, the dash-rod B being attached to the center of the cross bar $b$.

C represents a series of blades, which are suspended between the bars $a\ a$ parallel with each other and the cross-bar $b$. These blades C have tenons $c$ at their upper parts, one at each end, said tenons being fitted in holes in the bars $a\ a$, so that they may turn freely therein. The blades are about equal in breadth or depth to the bars $a\ a$, the lower edges of the former, when in a vertical position, being about flush with the lower edges of the bars $a\ a$, as shown in Fig. 1. The inner surfaces of the bars $a\ a$ are grooved, as shown at $e$, and the ends of the blades C work in these grooves, the latter limiting or controlling the movement of the former. These grooves $e$ at one side, 1, are vertical and they are inclined at the opposite side, 2, as shown in Fig. 1, the inclined sides of the grooves adjoining one another in pairs. The lower parts of the blades C, at the sides which do not face the inclined sides 2 of the grooves $e$, are beveled, as shown at 3. The dash thus constructed, it will be seen, is of square form, and is designed to be worked in a square churn and operated either directly by hand or through the medium of a lever. When the dash is forced down, the lower parts of the blades C will be forced apart, so that their ends will bear against the inclined sides 2 of the grooves $e$, as shown in red in Fig. 1, and the cream will be compressed in the narrow spaces between the upper parts of the blades and greatly agitated so as to cause the butter to be quickly produced. The blades assume a vertical position when the dash is drawn upward, and this working of the blades from a vertical to an inclined position, and vice versa, tends to produce a considerable commotion of the cream. In gathering the cream a slow motion of the dash downward has a tendency to unite or force the particles of butter together instead of driving it down and breaking and scattering them, as is the case with the ordinary reciprocating dasher.

The dash is designed to fit quite snugly in the churn, little space being allowed between its sides and the sides of the churn, so as to insure the cream being acted upon in the most efficient manner.

I do not claim, broadly, the use of movable slats in the dasher; but,

Having thus described my invention, what I claim as new, and desire to secure by Letters Patent, is—

The employment of the vertically-swinging beveled blades C, in combination with the grooved bars $a\ a$, the whole arranged and operating as herein shown and described.

BAXTER WRIGHT.

Witnesses:
NATHAN PARK,
G. W. STAFFORD.